July 26, 1927.
P. R. FORMAN
1,636,769
QUICK APPLICATION AND RELEASE VALVE
Filed Jan. 20, 1926
3 Sheets-Sheet 1
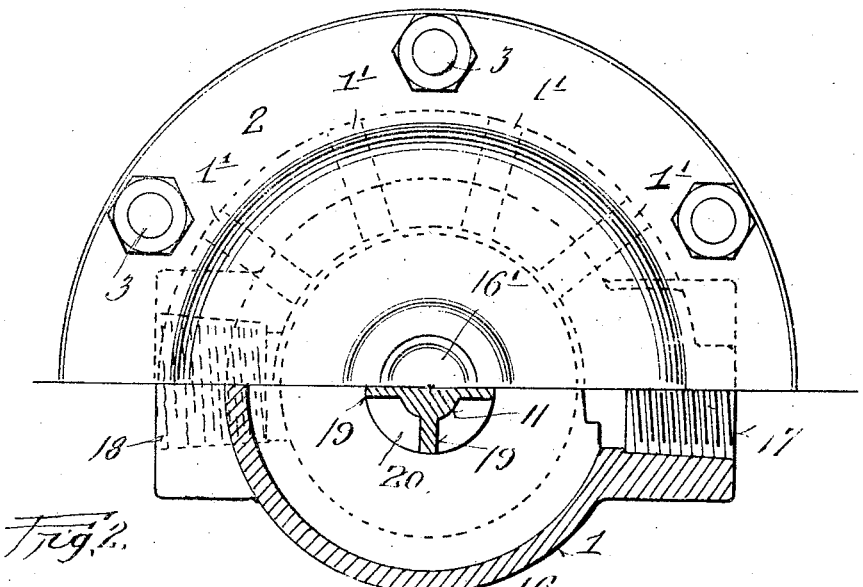
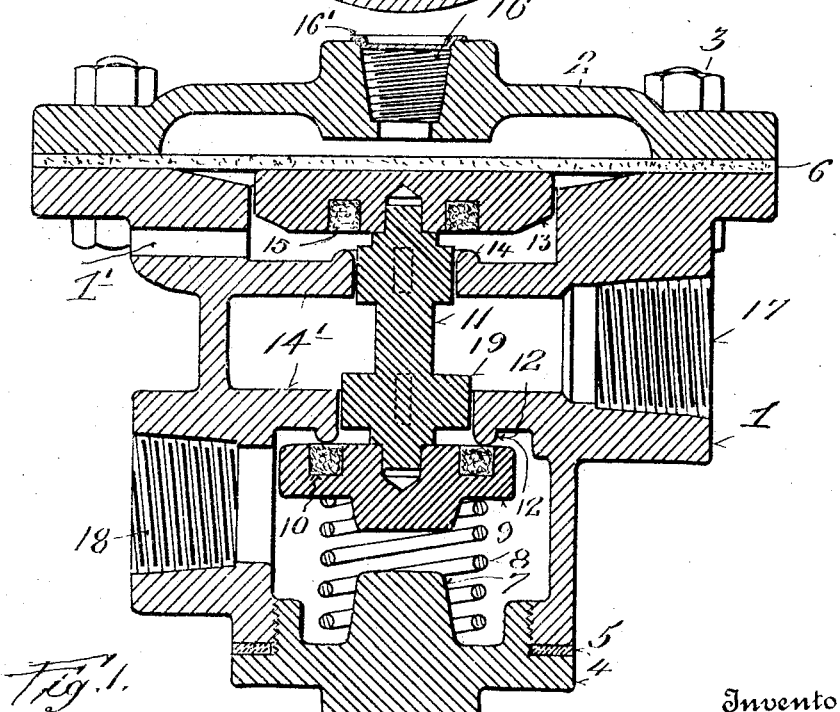

July 26, 1927.
P. R. FORMAN
QUICK APPLICATION AND RELEASE VALVE
Filed Jan. 20. 1926
1,636,769
3 Sheets-Sheet 2
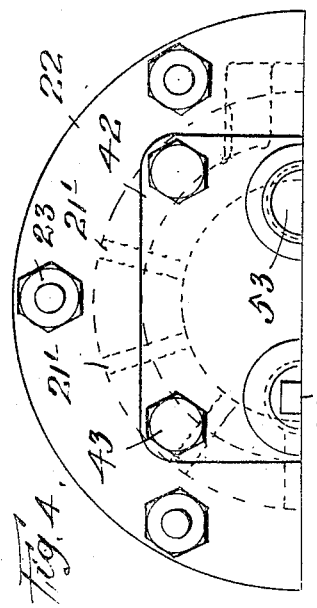
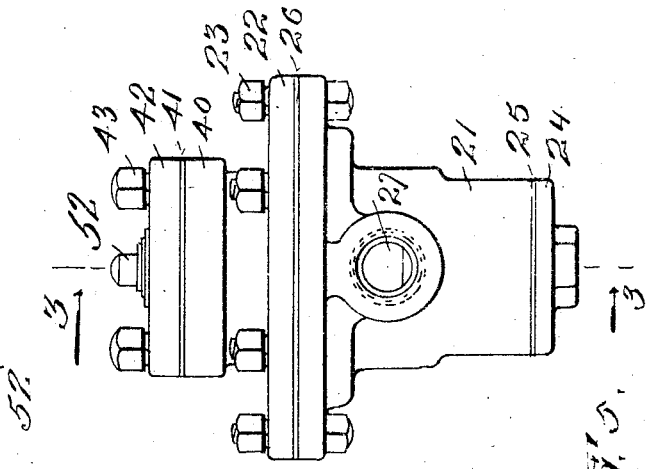
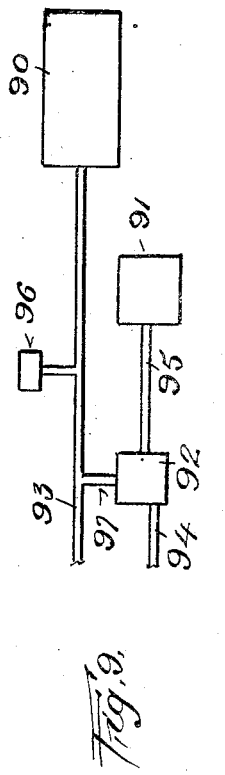
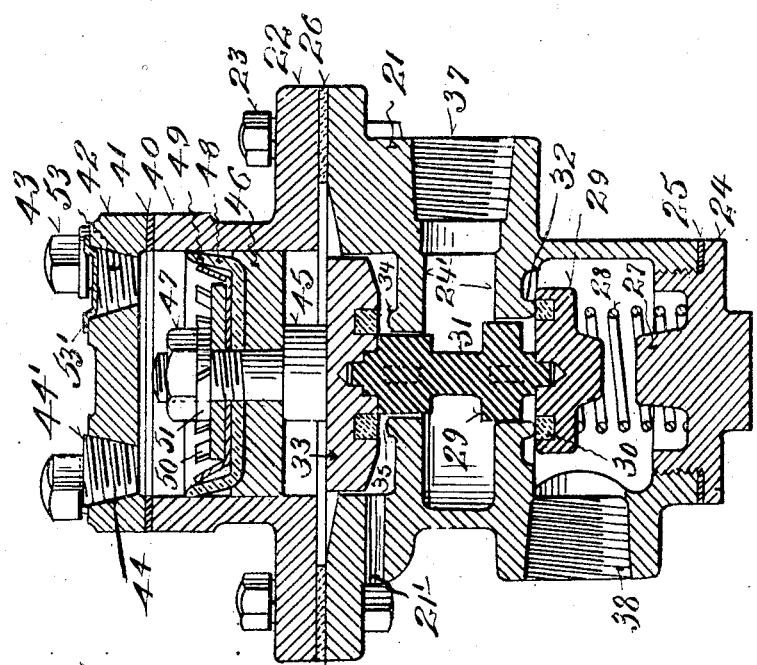
Inventor
Paris R. Forman
By his Attorneys Darby & Darby

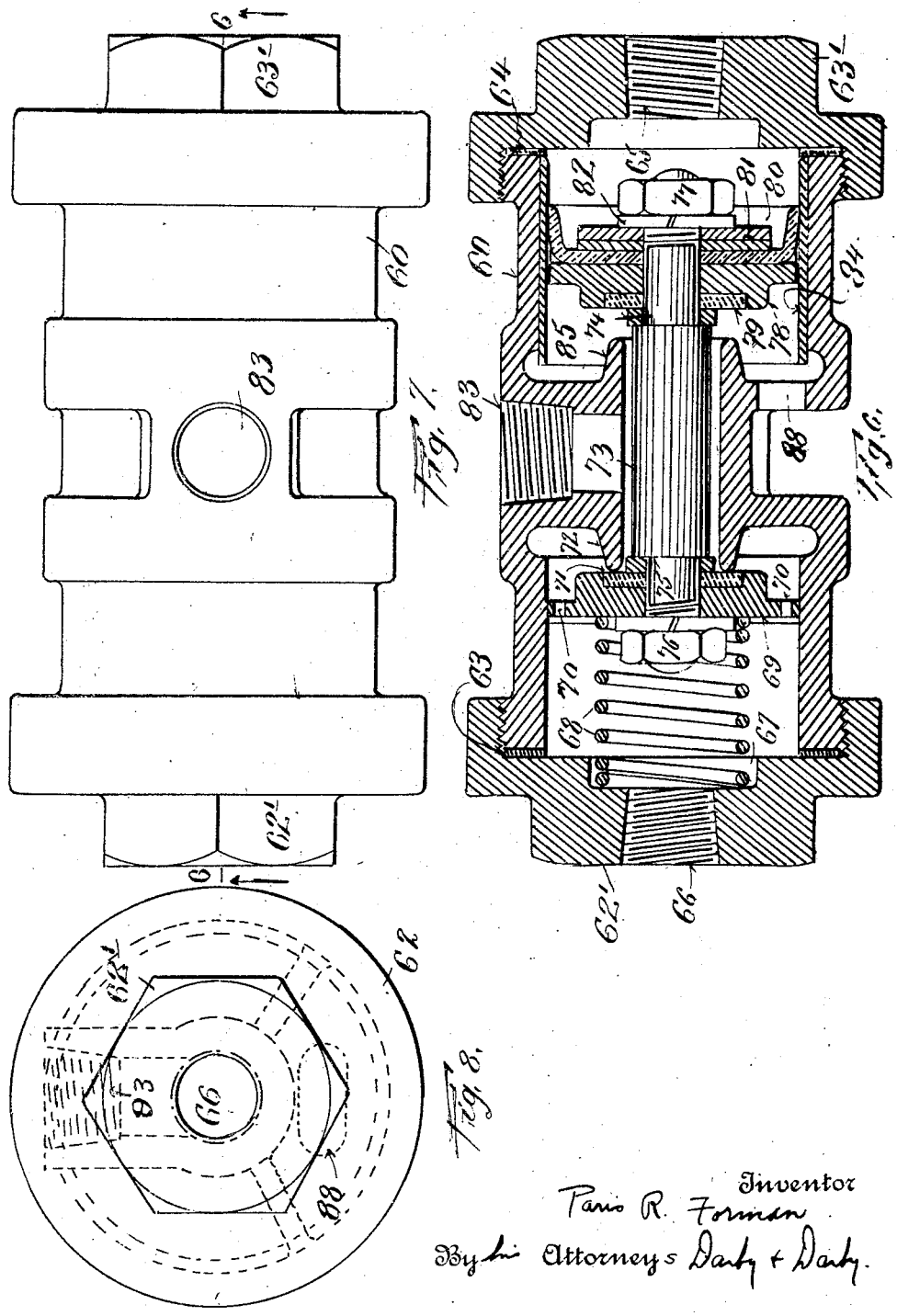

Patented July 26, 1927.

1,636,769

UNITED STATES PATENT OFFICE.

PARIS R. FORMAN, OF RAHWAY, NEW JERSEY, ASSIGNOR TO NATIONAL PNEUMATIC COMPANY, OF NEW YORK, N. Y., A CORPORATION OF WEST VIRGINIA.

QUICK APPLICATION AND RELEASE VALVE.

Application filed January 20, 1926. Serial No. 82,439.

This invention relates in general to a special form of valve for use in connection with door opening apparatus and vehicles of the type of street railway and subway trains.

One of the objects of this invention is the provision of a special form of valve by means of which it is possible upon the application of the brakes to supply fluid pressure to the door control devices.

Another object of my invention is the production of a new and novel valve which is simple and cheap to construct, and efficient in operation and maintenance.

This invention resides substantially in the combination, construction, arrangement and relative location of parts, all as may be more fully hereinafter disclosed.

Referring to the drawings in which the same reference numerals will be used throughout the several views to indicate the same parts, Fig. 1 is a central longitudinal, cross-sectional view of a valve employing the principles of my invention.

Fig. 2 is a top plan view of this valve shown partly in cross-section.

Fig. 3 is a central longitudinal cross-sectional view of another embodiment on the line 3—3 of Fig. 5 looking in the direction of the arrows.

Fig. 4 is a top plan view of the construction with parts broken away.

Fig. 5 is a side elevational view of the valve of Fig. 3.

Fig. 6 is a cross-sectional view taken on the line 6—6 of Fig. 7 looking in the direction of the arrows, and is a still further modification of my invention.

Fig. 7 is a side elevational view of this construction.

Fig. 8 is an end elevational view of the same construction.

Fig. 9 is an arrangement showing the use of a valve embodying the principles of my invention in a braking system.

In order that the pneumatic door opening system of a vehicle may be made as safe as possible, it is necessary that the system be so constructed, that the doors cannot be opened when the car is in motion, and when the brakes are not applied. In order to attain this feature, I have produced a special form of valve construction whereby it is possible to open the doors only after the brakes have been applied. In the particular forms of valves devised by me fluid pressure is fed from the door opening reservoir to the door engine control valves only upon an application of the fluid pressure to the brakes, as will appear more fully in the specification. As fluid pressure is fed to the brakes, it is also led to the special form of valve devised by me in such a manner that communication is established between the door opening reservoir and the door engine control valves, so that upon movement of the door engine control valves, the doors may be opened, but only after the brakes have been applied.

Referring now to the drawings and more particularly to Figs. 1 and 2, one form of my invention comprises a hollow valve body 1, having rigidly attached at one end a cap member 2, by means of nuts and bolts 3. At the other end of the body portion 1 is a large threaded plug 4 which forms an air tight connection with the body 1 in conjunction with the gasket 5. Clamped between the body member 1 and the cap 2 is a flexible diaphragm 6, which closes off the space between it and the cap 2. As appears clearly in the drawings the diaphragm 6 rests against the upper valve head 13. This diaphragm may be made of rubber, leather or any other suitable flexible material. On the plug 4 and extending into the hollow body member 1 is an integral projection 7 which serves to hold one end of the spring 8 in central alignment. This spring 8 forces a valve head 9 having therein packing 10 against a seat 12. At 13 is another valve head having mounted thereon a seat 15 which cooperates with another seat 14. The seats 12 and 14 surround the central openings in the transversely extending walls 14' which closes off the interior of the hollow body member into several compartments. The two valve heads 9 and 13 are jointed by a fluted spindle member 11.

The flute forming ridges 19 form spaces 20, which permit air to pass by the spindle 11 through the opening in the transversely extending walls 14'. Extending through the cap 2 at the center is a threaded opening 16 which has mounted within it a protecting cap 16'. Extending through the side walls of the member 1 are two threaded openings 17 and 18.

The threaded opening 16 receives a pipe extending from the passage leading to the brake mechanism, so that upon application of fluid pressure to the brake system, pressure is applied to the upper side of the flexible diaphragm 6, which forces the valve head 13, member 11 and valve head 9 downward so as to seat the valve head 13 on the seat 14, and unseat the valve head 9 from its seat 12. In doing this communication is established between the threaded openings 17 and 18, so that fluid pressure may be supplied from a suitable source to the control valve which operates the door opening mechanism. At 1' are a series of openings extending through the walls of the body member 1 to the atmosphere, so that while the diaphragm 6 is forcing the valve head structure downward, the fluid pressure which is acting through the opening 17 may be exhausted through the openings 1' in order not to oppose the downward action of the diaphragm 6.

Referring to Figs. 3, 4 and 5, I show a modification of my invention in which the valve structure is operated by means of a piston. The valve comprises a hollow body structure 21, having bolted to it at its upper end a hollow cap member 22 by means of nuts and bolts 23. Threaded onto the lower end of the body member 1 is a plug 24, which forms an air tight connection by means of the gasket 25. A similar gasket 26 is interposed between the body member and the cap 22, to form an air tight connection at this point. The cap member 24 has an inwardly extending central lug 27 which forms an aligning support for the spring 28, which normally presses the valve head 29 and its packing 30 against the seat 32. A similar valve head 33 with its packing 35 is connected to the valve head 29 by means of a fluted spindle 31 in such a manner that when the valve head 29 is normally seated the valve head 33 will be raised off its seat 34. These seats 32 and 34 are formed on the periphery of openings which extend through the transverse walls 24'. At 37 and 38 are threaded passages which extend through the walls of the body member 21. Formed integral with the valve head 33 is a short threaded stud 45, which has secured to it by means of the bolt 47 a piston 46. Mounted on the piston 46 is a leather or rubber cap washer, which is held in place by means of the metal piece 49, solid washer 50 and split washer 51 which cooperate in conjunction with the nut 47 to rigidly secure the piston structure to the valve head 33. Bolted to the upper end of the cap member 22 is a plate 42 which forms an air tight connection by means of the gasket 41, and the clamping bolts 43. Extending through the plate 42 are two threaded openings 44 and 53, the opening 53 has a protecting cap 53' and the opening 44 has threaded into it a plug 44'. Extending through the wall of the body member 21 is a series of openings 21', which connect the interior of the valve with the atmosphere.

The operation of this valve is similar to that previously given except that in this case as the brake fluid pressure is fed through the opening 53, pressure is exercised on the movable piston structure to unseat the normally seated valve head 29, and seat the normally unseated valve head 33, to establish communication between the pipes connected with the threaded openings 37 and 38.

Referring now to Figures 6, 7, and 8, wherein I have disclosed a more compact embodiment of my inventive idea, it will be evident that as before I have provided a hollow body member 60 having attached at both ends by means of threads the caps 62' and 63'. Gaskets 63 and 64 form air tight joints at these points of connection. Extending through the caps 62' and 63' are threaded openings 66 and 65 respectively. The cap 62' has formed on its inner surface a depression 67 which receives one end of the spring 68, the other end of which presses against a valve head 69, having mounted thereon a packing 71 and extending through the walls thereof the openings 70. The valve head 69 seats on the edge 72 formed integrally with the body member. Another valve head 78 with its packing 79 seats on the edge 85 formed on a wall integral with the body member 60. The two valve heads 69 and 78 are rigidly secured to a short pin 73 having at its ends threaded studs 74 and 75 which by means of cooperating nuts 76, 77 secure the valve heads to the short rods 73. A cup shaped washer is held securely against the valve head 78 and encircling the stud 74 by means of the washer 81 and split washer 82 and nut 77. Extending through the side wall of the body member 60 is a threaded opening 83. Exhaust ports 88 are also provided in the wall of the body members 60 to form communications with the interior of the member 60 and the atmosphere. The piston end of the member 60 is lined with a cylindrical casing 84, which may be of any desirable material to form a suitable cylinder wall. The operation of this valve is similar to the two preceding ones.

As fluid pressure is supplied to the air brake line, it is also fed by means of a pipe, through the threaded opening 65 into th piston cylinder to force the piston and with it the valve heads 69 and 78 to the left as shown in Figure 6, so as to unseat the valve head 69 against the action of the spring 68 and to seat the valve 78. By this operation communication is established between the pipes connected to the threaded openings 66 and 83, so that fluid pressure may be supplied from the door opening reservoir to the valve which controls the door operating mechanism.

In Figure 9 is a diagrammatic arrangement of my improved valve in a braking system. The tank 90 is the brake fluid pressure reservoir, connected by pipe 93 to the brake engines through control devices. The valve 96 is a brake safety valve of the usual type found in the air brake line of vehicles. The valve 92 which is the valve of my present invention is connected by pipe 97 to the air brake line 93. At 91 is another reservoir which is used to supply fluid pressure to the door opening engines through the lines 95, 92 and 94. When the valve 96 is operated to allow fluid pressure to flow through pipe 93 to the brake engines, pressure is applied to valve 92 as described before to allow pressure from reservoir 91 to travel to the door engine control devices. This system could be utilized if the same reservoir were used to supply both the door engines and the brake engines.

It will be evident to one skilled in the art that many modifications and changes in details of construction will readily suggest themselves, without involving invention, and I do not, therefore, desire to be limited to the structure shown by way of illustration, but rather to the spirit and scope of my invention, as I define it in the appended claims.

What I claim, therefore, as new and useful, of my own invention, and desire to secure by Letters Patent, is:

1. In a braking system the combination of a plurality of fluid pressure sources one of which is connected to the brake operating means and a quick application valve whereby fluid pressure is supplied to the door control valve from another of said sources when the brakes are applied.

2. In a braking system the combination of a plurality of fluid pressure sources one of which is connected to the brake operating means and a valve operated by the brake fluid pressure to release the fluid pressure from another of said sources whereby the doors may be opened by a suitable control device.

3. In a braking system the combination of a plurality of fluid pressure sources one of which is connected to the brake operating means and a valve operated by an application of the brakes to supply fluid pressure to the door opening control valves.

4. In a braking system the combination of a plurality of fluid pressure sources and a fluid pressure operated valve whereby on application of the brakes fluid pressure is supplied to a door control valve, said means including a closed chamber having a flexible wall.

5. A quick application and release valve comprising a body portion having an inlet and outlet opening, a seat within said body portion and fluid pressure operated means for uncovering said seat, said means including a closed chamber having a flexible wall.

6. A quick application and release valve comprising a body portion having an inlet and outlet opening, a valve head and seat within said body portion, spring means for holding said valve head on said seat and fluid pressure means for unseating said head against the action of said spring, said means including a closed chamber having a flexible wall.

7. A quick application and release valve comprising a body portion having an inlet and outlet opening a plurality of seats within said body portion, a head normally held seated on one of said seats and fluid pressure means for unseating said head, said means including a closed chamber having a flexible wall.

8. In a quick application and release valve a hollow body member having a plurality of threaded openings, a plurality of partitions within said member having seats thereon, a plurality of valve heads for said seats, and means for unseating one head and seating the other whereby communication is established between said threaded openings, said means including a closed chamber having a flexible wall.

9. In a quick application and release valve a hollow body member having a plurality of threaded openings, a plurality of partitions within said member having seats thereon, valve heads for said seats, one of said heads being normally seated and fluid pressure means for unseating said normally seated head and seating the other of said heads whereby communication is established between said threaded openings.

10. In a quick application and release valve, a hollow body member having threaded openings therein, transversely extending walls within said body member having seats thereon, valve heads for said seats joined by a spindle member, one of said heads being normally held seated by a spring, and fluid pressure operated means for unseating said normally seated head and seating the other of said heads whereby communication is established between said threaded openings.

11. In a quick application and release valve, a hollow body member having threaded openings therein, caps on the ends of said body member, transversely extending walls within said body members having seats thereon, valve heads for said seats joined by a spindle member, one of said heads being normally held seated by a spring, and fluid pressure operated means for unseating said normally seated head and seating the other of said heads whereby communication is established between said threaded openings.

12. In a quick application and release valve a hollow body member having threaded openings therein, cap members on the ends of said body member forming a closed chamber, transverse walls within said body member having openings therein with seats on the edges of the openings, valve heads for said openings joined by a fluted member, a spring normally holding one of said heads on its seat and the other off its seat and fluid pressure operated means for unseating said normally seated head and seating said normally unseated head whereby communication is established between said threaded openings.

13. In a quick application and release valve a hollow body member having threaded caps on its ends with threaded openings therein, seats within said body member, valve heads for said seats and piston operated means for unseating one of said heads and seating the other of said heads whereby communication is established between an opening in said body member and the opening in one of the caps.

14. In a quick application and release valve a hollow body member having threaded caps on its ends with threaded openings therein, seats within said body member, valve heads for said seats secured together, spring means for holding one head seated and the other unseated, a piston attached to the unseated head so that on application of fluid pressure to said piston the valve head structure is moved to unseat one head and seat the other.

15. In a quick application and release valve a hollow body member having threaded caps on its ends with threaded openings therein, seats within said body member, valve heads for said seats secured together, spring means for holding one head seated and the other unseated, a piston attached to the unseated head so that on application of fluid pressure to said piston the valve head structure is moved to unseat one head and seat the other, said body having an exhaust opening therein.

In testimony whereof I have hereunto set my hand on this 14th day of January A. D., 1926.

PARIS R. FORMAN.